US012609498B2

(12) United States Patent
Yoshihara

(10) Patent No.: US 12,609,498 B2
(45) Date of Patent: Apr. 21, 2026

(54) CONNECTOR DEVICE HAVING HOUSING AND FIRST AND SECOND TERMINALS HELD ON HOUSING

(71) Applicant: HIROSE ELECTRIC CO., LTD., Kanagawa (JP)

(72) Inventor: Yuya Yoshihara, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 284 days.

(21) Appl. No.: 18/491,171

(22) Filed: Oct. 20, 2023

(65) Prior Publication Data

US 2025/0132530 A1 Apr. 24, 2025

(30) Foreign Application Priority Data

Oct. 28, 2022 (JP) ................................ 2022-173099

(51) Int. Cl.
*H01R 24/84* (2011.01)
*H01R 13/6471* (2011.01)

(52) U.S. Cl.
CPC ......... *H01R 24/84* (2013.01); *H01R 13/6471* (2013.01)

(58) Field of Classification Search
CPC ..... H01R 13/6471; H01R 13/28; H01R 24/84
USPC ................................................. 439/289, 295
See application file for complete search history.

(56) References Cited

U.S. PATENT DOCUMENTS

| | | | | | |
|---|---|---|---|---|---|
| 4,734,060 | A * | 3/1988 | Kawawada | H01R 13/28 | 439/862 |
| 4,971,565 | A * | 11/1990 | Fox, Jr. | H01R 13/28 | 439/74 |
| 5,161,985 | A * | 11/1992 | Ramsey | H01R 24/84 | 439/74 |
| 5,199,884 | A * | 4/1993 | Kaufman | H01R 12/716 | 439/570 |
| 5,593,311 | A * | 1/1997 | Lybrand | H01R 24/62 | 439/607.11 |
| 5,697,799 | A * | 12/1997 | Consoli | H01R 12/73 | 439/910 |
| 5,904,581 | A * | 5/1999 | Pope | H01R 24/60 | 439/74 |
| 5,971,800 | A * | 10/1999 | Azuma | G06F 1/1656 | 439/502 |

(Continued)

FOREIGN PATENT DOCUMENTS

| | | | |
|---|---|---|---|
| JP | 3355403 B2 | | 12/2002 |
| JP | 2012059386 A | * | 3/2012 |

*Primary Examiner* — Marcus E Harcum
(74) *Attorney, Agent, or Firm* — RANKIN, HILL & CLARK LLP

(57) ABSTRACT

A connector device includes a housing, a plurality of first terminals, and a plurality of second terminals. First contact portions provided in the first terminals are arrayed at predetermined intervals in a first butting surface of the housing in a state of being contactable with second partner terminals of a partner connector device when the connector device is connected to the partner connector device. Second contact portions provided in the second terminals are arrayed at the predetermined intervals in a second butting surface of the housing positioned facing the first butting surface in a depth direction in a state of being contactable with first partner terminals of the partner connector device when the connector device is connected to the partner connector device.

19 Claims, 10 Drawing Sheets

(56) References Cited

U.S. PATENT DOCUMENTS

| | | | | | |
|---|---|---|---|---|---|
| 6,074,230 | A * | 6/2000 | Comerci | H01R 24/84 | 439/862 |
| 6,162,081 | A | 12/2000 | Commerci et al. | | |
| 6,537,087 | B2 * | 3/2003 | McNamara | H01R 13/6585 | 439/607.07 |
| 7,220,140 | B2 * | 5/2007 | Nagano | H01R 13/506 | 439/288 |
| 7,785,152 | B2 * | 8/2010 | Yi | H01R 13/514 | 439/660 |
| 7,976,326 | B2 * | 7/2011 | Stoner | H01R 13/193 | 439/74 |
| 8,277,241 | B2 * | 10/2012 | Horchler | H01R 24/84 | 439/74 |
| 10,312,636 | B2 * | 6/2019 | Yu | H01R 13/6585 | |
| 2005/0101165 | A1 * | 5/2005 | Pan | H01R 12/714 | 439/79 |
| 2013/0337698 | A1 * | 12/2013 | Little | H01R 13/631 | 439/660 |
| 2014/0273652 | A1 * | 9/2014 | Szu | H01R 13/6585 | 439/660 |
| 2017/0093091 | A1 * | 3/2017 | Cheng | H01R 24/62 | |
| 2020/0059044 | A1 * | 2/2020 | Zhang | H01R 12/727 | |
| 2020/0235507 | A1 * | 7/2020 | Huang | H01R 13/6471 | |
| 2021/0126401 | A1 * | 4/2021 | Musser | H01R 13/41 | |
| 2021/0210907 | A1 * | 7/2021 | Liu | H01R 13/6477 | |

* cited by examiner

CONNECTOR DEVICE HAVING HOUSING AND FIRST AND SECOND TERMINALS HELD ON HOUSING

CROSS-REFERENCE TO RELATED APPLICATION

This application claims priority from Japanese Patent Application No. 2022-173099 filed with the Japan Patent Office on Oct. 28, 2022, the entire content of which is hereby incorporated by reference.

BACKGROUND

1. Technical Field

One aspect of the present disclosure relates to a connector device.

2. Related Art

There is a connector device having such a structure that terminals provided in opposing first and second surfaces of a housing are fixed to, e.g., a circuit board at grounding portions of the terminals. This connector device is disclosed, for example, in Japanese Patent No. 3355403. This literature discloses mutually-joinable electric connectors including a pair of hermaphroditic connectors. These electric connectors include the pair of hermaphroditic connectors having opposing joint surfaces. The joint surfaces are arranged in parallel along a plane when the pair of hermaphroditic connectors is joined to each other. Each joint surface is defined by a plurality of ribs defining a plurality of grooves and arranged apart from each other in a longitudinal direction. A contact portion of each terminal is arranged in the groove formed between the ribs in the housing. Such a contact portion has a flat contact portion and an inclined portion extending from the contact portion toward a wall of the housing. When the hermaphroditic connectors are joined to each other at the joint surfaces, the joint surfaces butt each other. Further, the contact portions of the hermaphroditic connectors, i.e., partner connectors, protruding toward each other are connected to each other at the inclined portions.

When the pair of hermaphroditic connectors is joined to each other, the terminals provided in the opposing first and second surfaces of the housing are arrayed in line along the longitudinal direction in each of the first and second surfaces, and are arrayed in two lines in a direction of the first and second surfaces facing each other. Terminal tails of the terminals are fixed to the circuit board. The terminal tails of the terminals arrayed in line along the longitudinal direction in the first surface and the terminal tails of the terminals arrayed in line along the longitudinal direction in the second surface are positioned substantially fully overlapping with each other in the direction of the first and second surfaces facing each other. For this reason, it is substantially impossible or difficult to check, e.g., the positions and states of these terminal tails upon fixing to the circuit board. As a result, it is difficult to find defective products, for example.

SUMMARY

A connector device that includes a housing having a height direction, a width direction, and a depth direction perpendicular to each other; and a plurality of first terminals and a plurality of second terminals held on the housing, in which each of the first terminals has a first contact portion provided on one end side, and at least the first contact portions of the first terminals are arrayed at a predetermined interval along the width direction in a first butting surface of the housing defined by the height direction and the width direction in a state of being contactable with second partner terminals of a partner connector device when the connector device is connected to the partner connector device; each of the second terminals has a second contact portion provided on one end side, and at least the second contact portions of the second terminals are arrayed at the predetermined interval along the width direction at positions corresponding to the first terminals in a second butting surface of the housing defined by the height direction and the width direction and positioned facing the first butting surface in the depth direction in a state of being contactable with first partner terminals of the partner connector device when the connector device is connected to the partner connector device; and when the first butting surface or the second butting surface is viewed along the depth direction, at least part of first grounding surfaces of first grounding portions provided on the other end side of the first terminals and at least part of second grounding surfaces of second grounding portions provided on the other end side of the second terminals are simultaneously visually recognizable.

DETAILED DESCRIPTION

Figure 1:
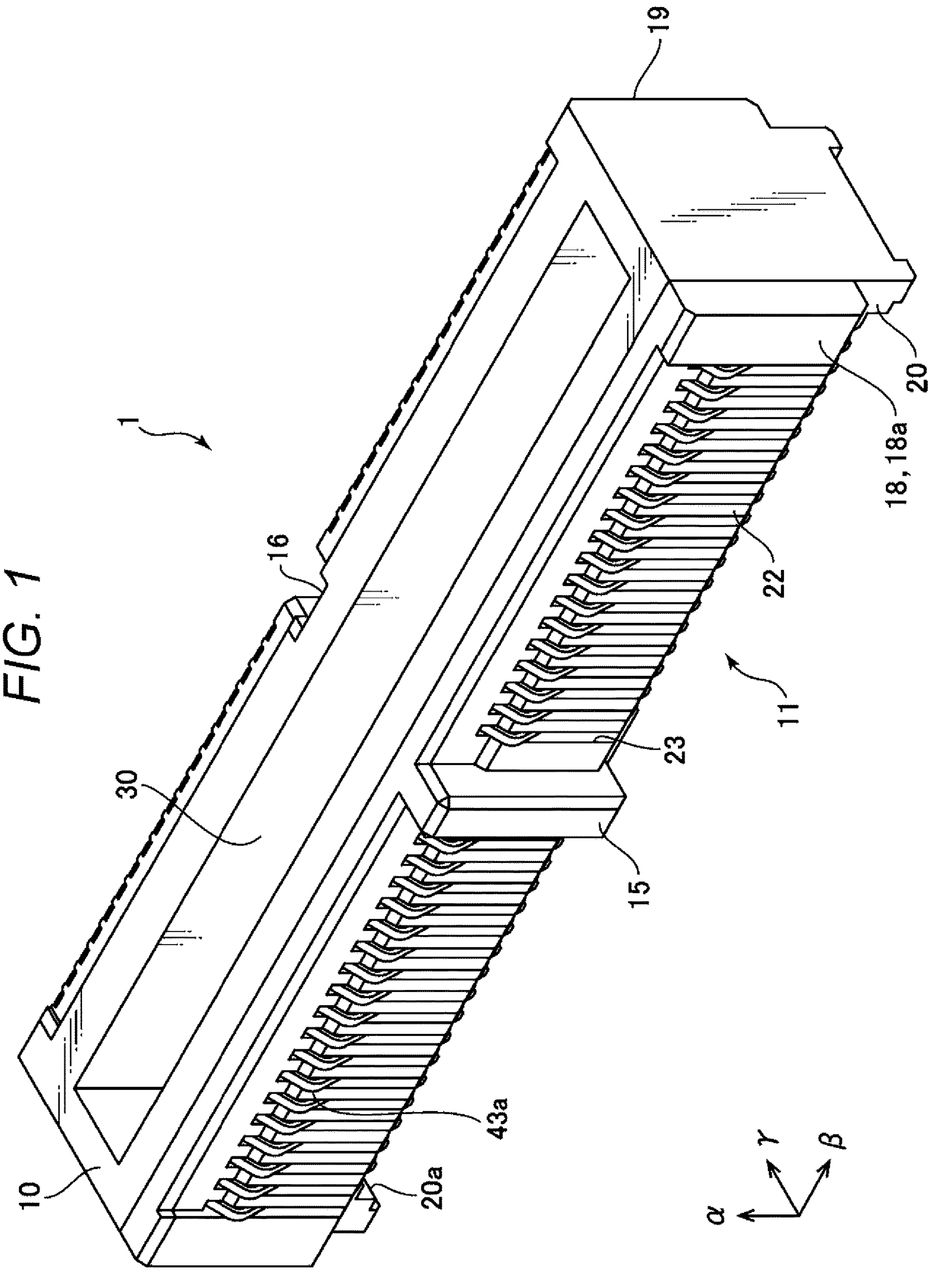
FIG. 1 is an upper perspective view of a connector device according to one preferred embodiment of the present disclosure.

One object of the present disclosure is to provide the following connector device. According to this connector device, the positions and states of leg portions of terminals arrayed in a first surface of a housing and leg portions of terminals arrayed in a second surface of the same housing can easily checked in a direction of the first and second surfaces facing each other.

One aspect of the present disclosure is a connector device that includes a housing having a height direction, a width direction, and a depth direction perpendicular to each other; and a plurality of first terminals and a plurality of second terminals held on the housing, in which each of the first terminals has a first contact portion provided on one end side, and at least the first contact portions of the first terminals are arrayed at a predetermined interval along the width direction in a first butting surface of the housing defined by the height direction and the width direction in a state of being contactable with second partner terminals of a partner connector device when the connector device is connected to the partner connector device; each of the second terminals has a second contact portion provided on one end side, and at least the second contact portions of the second terminals are arrayed at the predetermined interval along the width direction at positions corresponding to the first terminals in a second butting surface of the housing defined by the height direction and the width direction and positioned facing the first butting surface in the depth direction in a state of being contactable with first partner terminals of the partner connector device when the connector device is connected to the partner connector device; and when the first butting surface or the second butting surface is viewed along the depth direction, at least part of first grounding surfaces of first grounding portions provided on the other end side of the first terminals and at least part of second grounding surfaces of second grounding portions provided on the other end side of the second terminals are simultaneously visually recognizable.

According to the connector device of this aspect, the positions and states of the first and second grounding surfaces can be easily checked in the depth direction. Thus, for example, a positional relationship in the height direction between the first and second grounding surfaces can be compared (grasped), and the flatness thereof can be measured.

According to one aspect of the present disclosure, the following connector device is provided. According to this connector device, e.g., the positions and states of leg portions of terminals arrayed in a first surface of a housing and leg portions of terminals arrayed in a second surface of the same housing can easily checked in a direction of the first and second surfaces facing each other.

Hereinafter, exemplary embodiments of the present disclosure will be described with reference to the attached drawings. For the sake of convenience in description, only preferred embodiments will be described. However, the technique of the present disclosure is not limited to these embodiments, needless to say.

Figure 2:
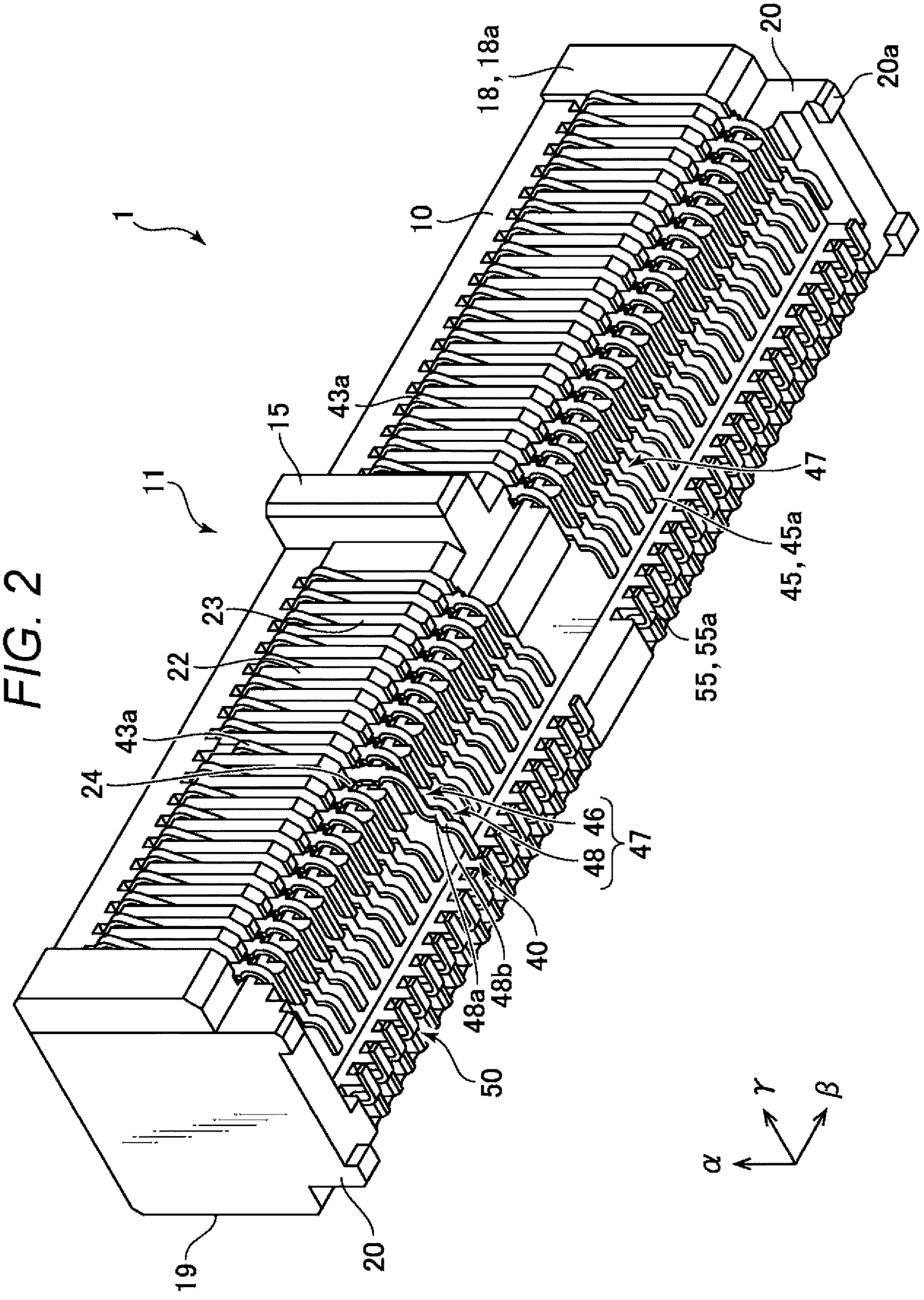
FIG. 2 is a lower perspective view of the connector device of FIG. 1.
Figure 3:
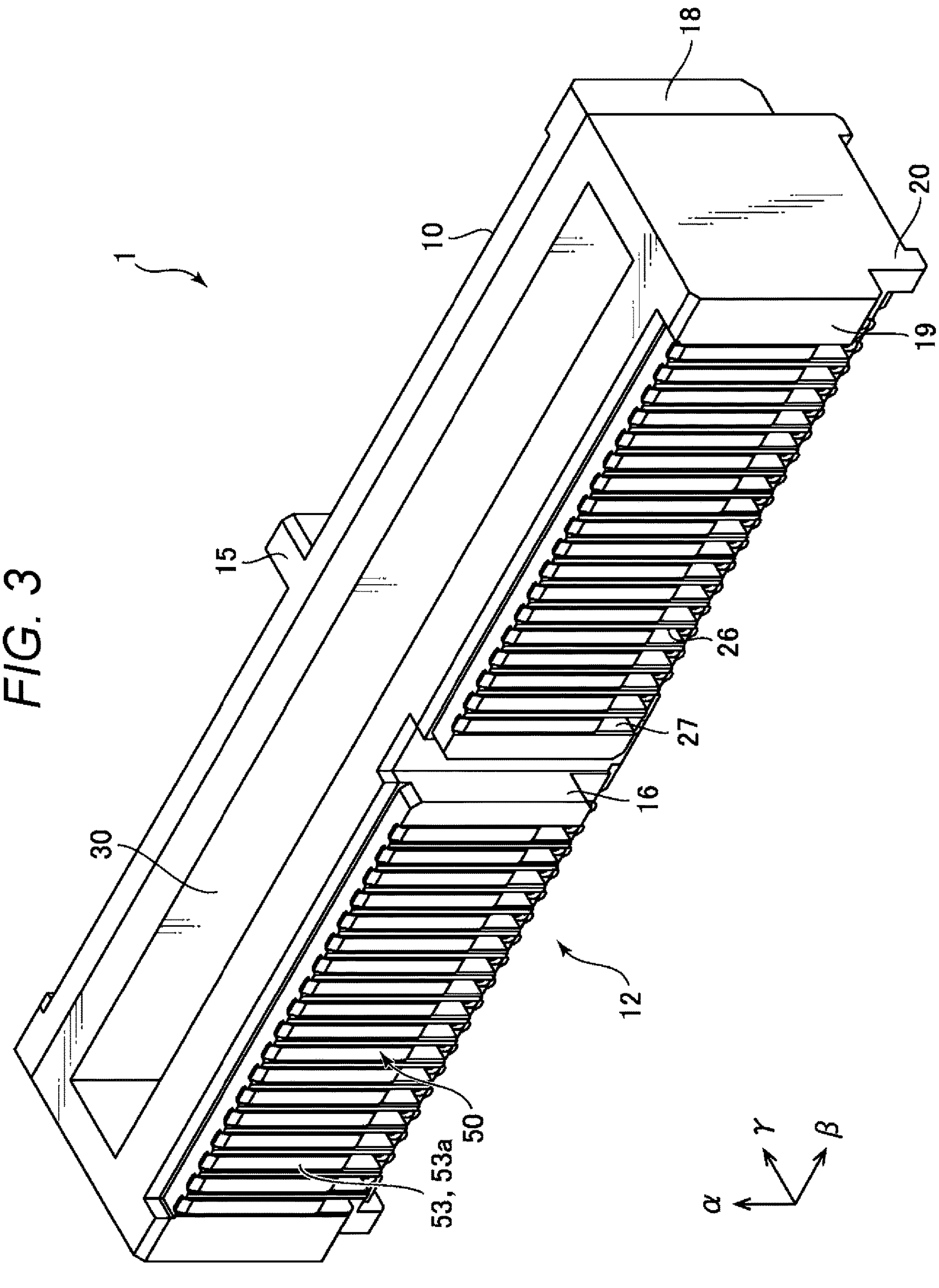
FIG. 3 is an upper perspective view of the connector device of FIG. 1 from a different angle.
Figure 4:
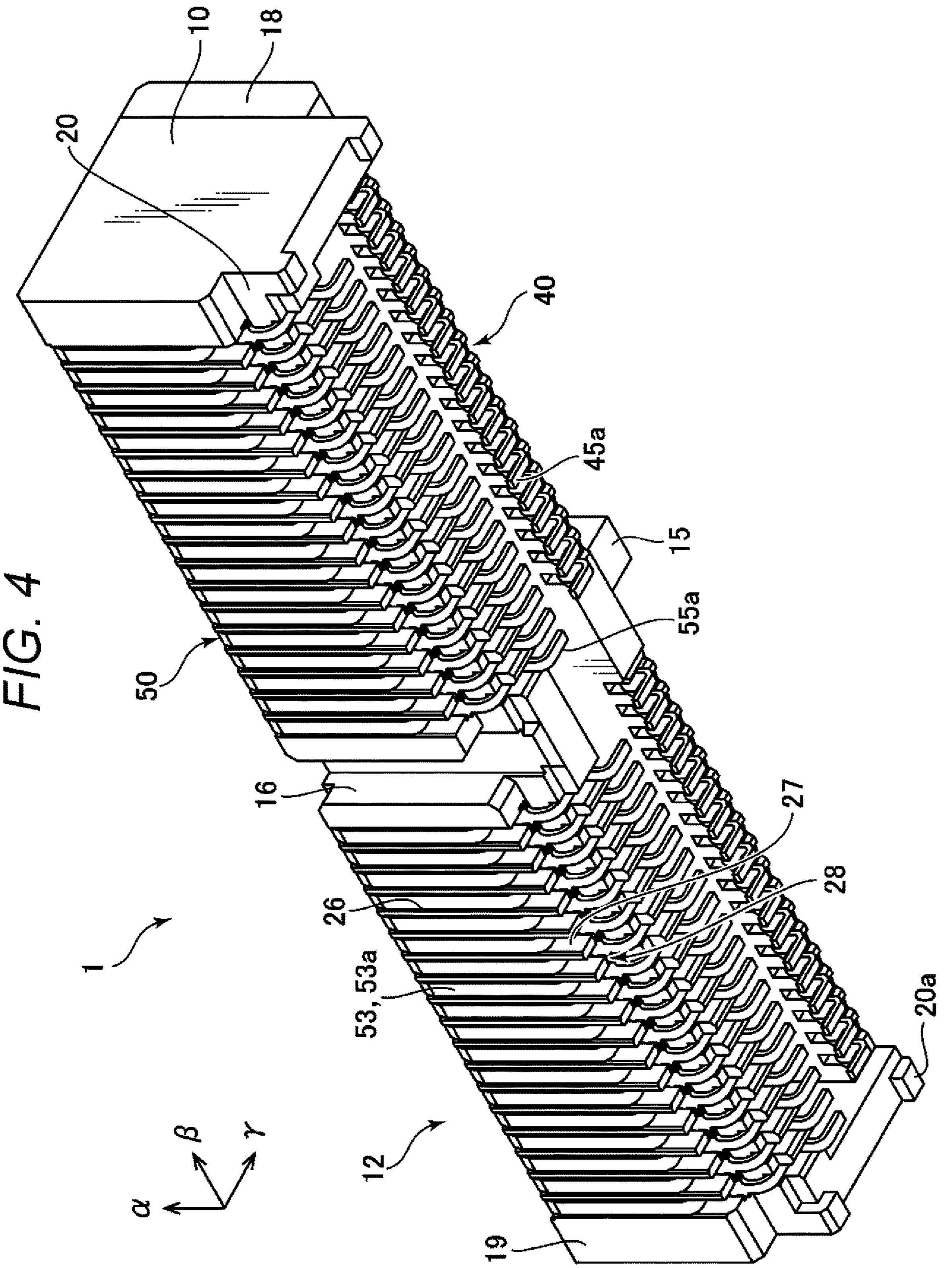
FIG. 4 is a lower perspective view of the connector device of FIG. 1.
Figure 5:
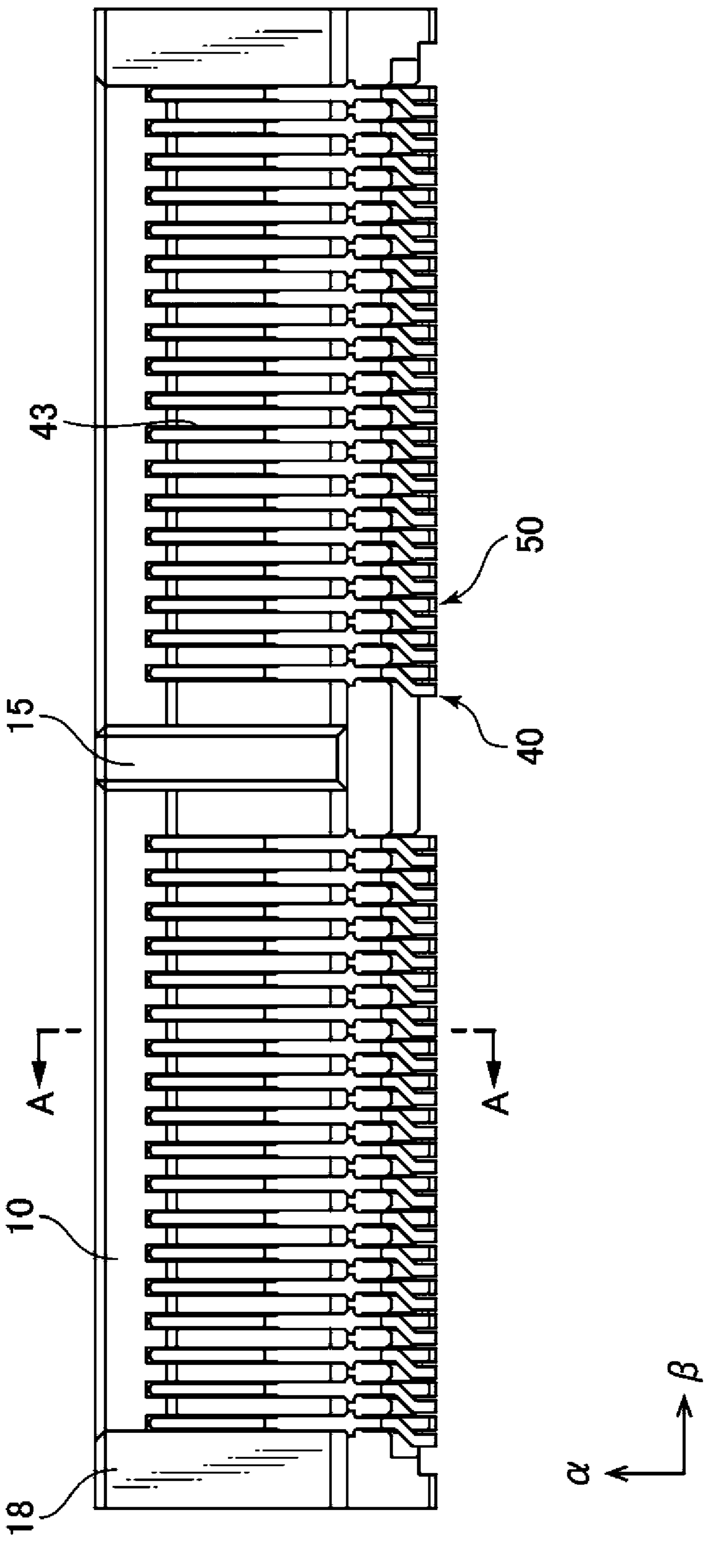
FIG. 5 is a front view of the connector device of FIG. 1.
Figure 6:
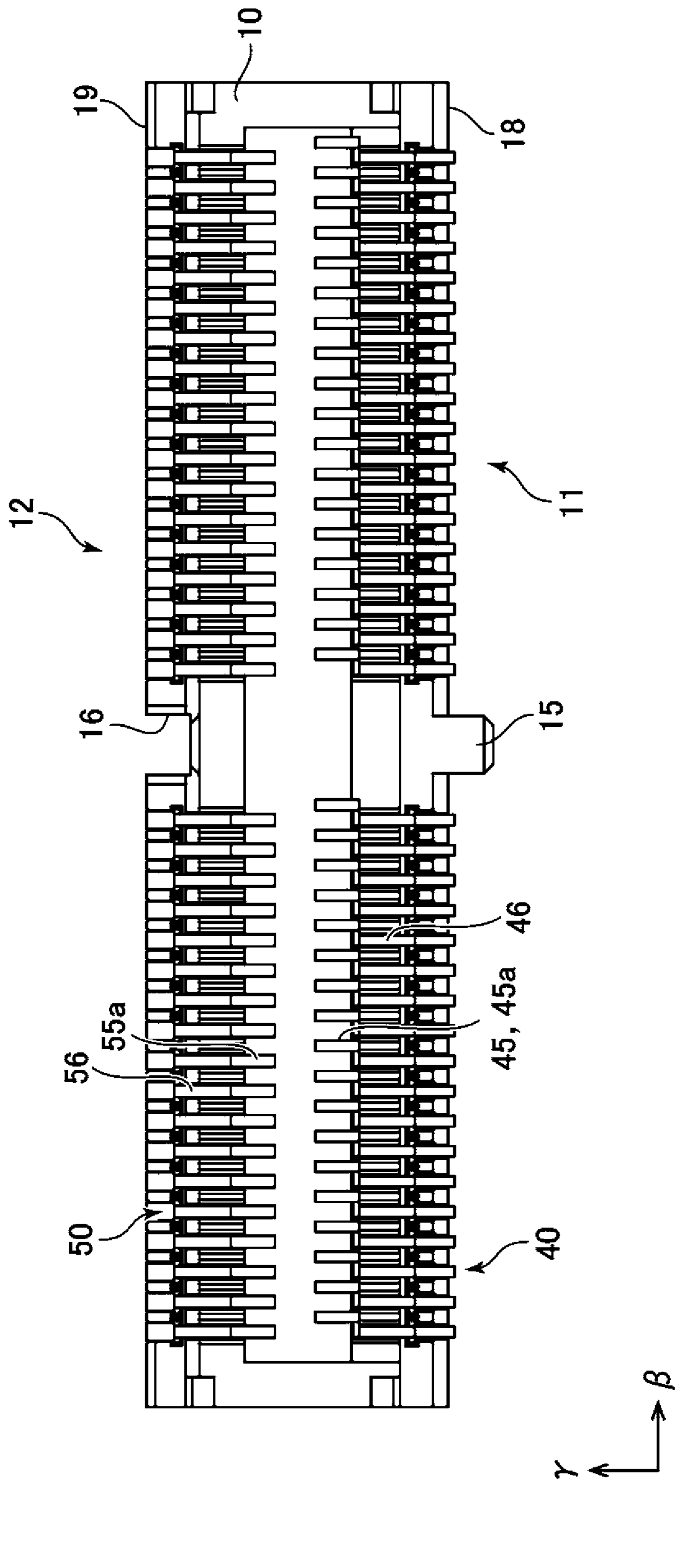
FIG. 6 is a bottom view of the connector device of FIG. 1.

FIG. 1 is an upper perspective view of a connector device according to one preferred embodiment of the present disclosure. FIG. 2 is a lower perspective view of the connector device. FIG. 3 is an upper perspective view of the connector device from a different angle. FIG. 4 is a lower perspective view of the connector device. FIG. 5 is a front view of the connector device. Further, FIG. 6 is a bottom view of the connector device.

Figure 7:
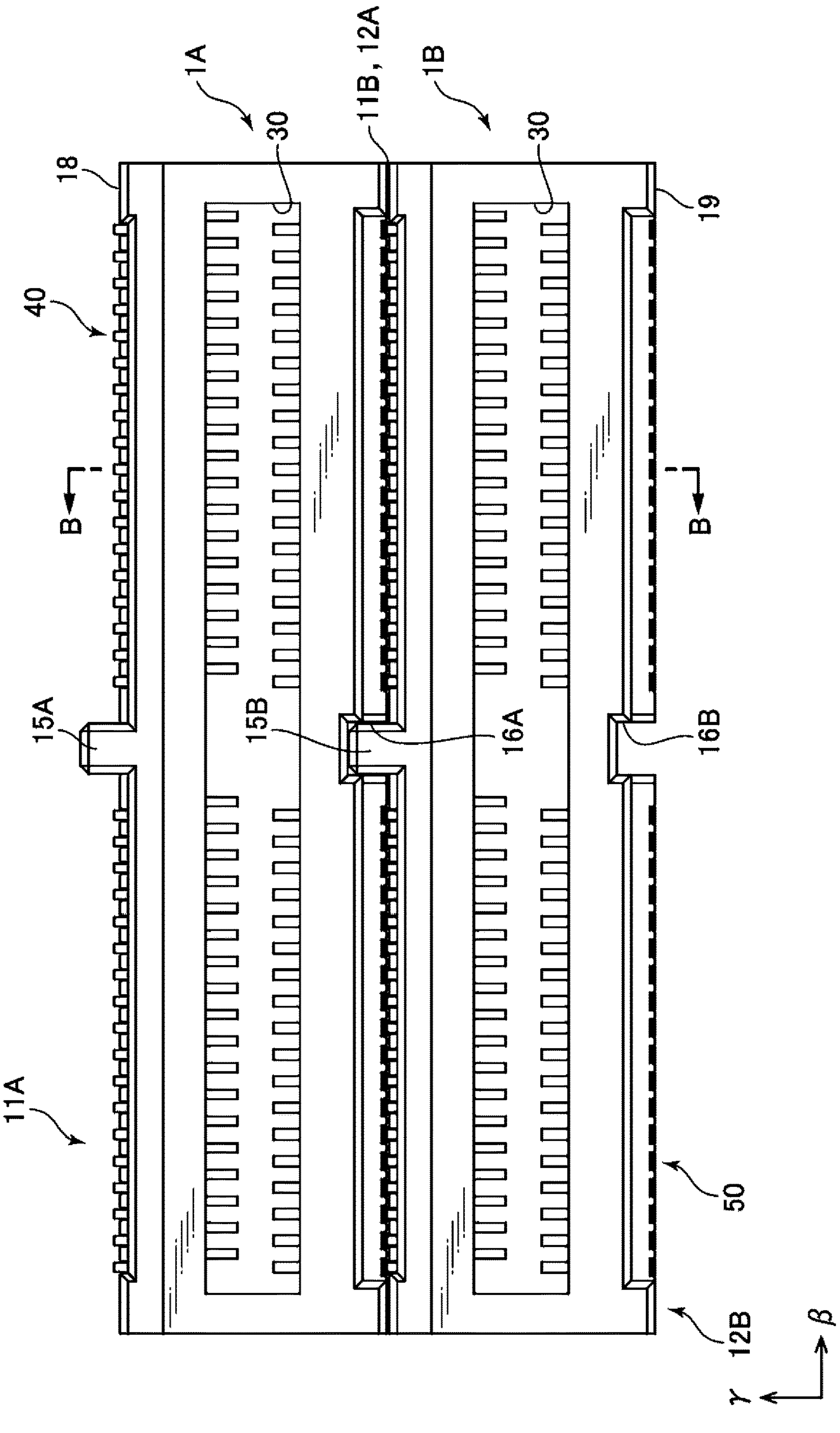
FIG. 7 is a view showing one use example of the connector device of FIG. 1.

The connector device 1 shown in these figures is connectable to a connector of the same type. That is, connector devices 1 are typically used in a pair as shown in FIG. 7. In other words, the connector device and a partner connector device having the same or substantially same structure as that of the connector device, i.e., hermaphroditic connector devices, are connected to each other. Hereinafter, for the sake of convenience, in a case where the connector devices 1 connected to each other are distinguished from each other, reference numerals for one of the connector devices 1 and members thereof will be assigned with "A," and reference numerals for the other connector device 1, i.e., the partner connector device, and members thereof will be assigned with "B."

In a case of using the present connector device 1, for example, at least one connector device 1A is provided at an edge of a board (not shown) on which an instrument is arranged, and at least one partner connector device 1B is provided at an edge of another board (not shown) on which another instrument is arranged. By moving these boards toward each other, these connector devices 1A, 1B are connected to each other, and in addition, the instruments on the boards are connected to each other. Note that the present connector devices 1 are not necessarily used in the form of the pair of connector device 1A and partner connector device 1B. The present connector device 1 may be used in combination with another connector device (not shown) having such a corresponding shape that the another connector device is connectable to the present connector device 1. Alternatively, three or more connector devices 1 may be connected to each other.

The connector device 1 (1A, 1B) includes a resin housing 10 and a plurality of first terminals 40 and a plurality of second terminals 50 held on the housing 10. The housing 10 has a height direction "α," a width direction "β," and a depth direction "γ" perpendicular to each other, and as a whole, has a substantially rectangular shape. The housing 10 has a symmetric shape in the width direction "β." In a "β-γ plane" defined by the width direction "β" and the depth direction "γ," a through-hole 30 penetrating the housing 10 along the height direction "α" may be provided. The advantages of the through-hole 30 being provided will be described later. Here, each term of the height direction, the width direction, and the depth direction is merely a term for distinguishing three directions from each other, and these terms themselves do not have special meanings. Needless to say, the dimension of the housing 10 in each of these directions is not also particularly limited. For example, as shown in the figures, the width direction "β" may be taken as a longitudinal direction and the depth direction "γ" may be taken as a lateral direction, or conversely, the width direction may be taken as a lateral direction and the depth direction may be taken as a longitudinal direction, for example.

The housing 10 has a first butting surface 11 defined by the height direction "α" and the width direction "β" and a second butting surface 12 similarly defined by the height direction "α" and the width direction "β." The first butting surface 11 and the second butting surface 12 are arranged so as to face each other in the depth direction "γ." In the first butting surface 11, the plurality of first terminals 40 are arrayed at predetermined intervals along the width direction "β" with inserted one by one in grooves 23 which are formed between each adjacent ones of ribs 22. Similarly, in the second butting surface 12, the plurality of second terminals 50 are arrayed at the same predetermined intervals as those of the first terminals 40 along the width direction "β" at positions corresponding to the first terminals 40 with inserted one by one in grooves 27 which are formed between each adjacent ones of ribs 26. Further, leg portions 20 to be used upon installation of the connector device 1 on, e.g., the board are provided on a bottom portion of the housing 10 in the height direction "α." The leg portions 20 have, for example, a function of maintaining a constant distance of the first terminals 40 and the second terminals 50 from, e.g., the board to reduce terminal damage.

The connector device 1A and the partner connector device 1B are connectable to each other in the height direction "α," the depth direction "γ," or any direction along a diagonal direction including the height direction "α" and the depth direction "γ." When the connector device 1A is connected to the partner connector device 1B, the second butting surface 12A of the connector device 1A butts the first butting surface 11B of the partner connector device 1B, or the first butting surface 11A of the connector device 1A butts the second butting surface 12B of the partner connector device 1B. As a result, for example, the second terminals 50 arrayed in the second butting surface 12A of the connector device 1A and the first terminals 40 arrayed in the first butting surface 11B of the partner connector device 1B are electrically and physically connected to each other in one-to-one correspondence. In this state, side end portions 19 provided at both ends of the second butting surface 12A in the width direction "β" and side end portions 18 provided at both ends of the first butting surface 11B in the width direction "β" collide each other. Accordingly, application of excessive force to between the first terminals 40 and the second terminals 50 is reduced.

When the connector device 1A is connected to the partner connector device 1B, the connector device 1A and the partner connector device 1B may have a first engaging member and a second engaging member in order to align the connector device 1A and the partner connector device 1B with each other. For example, in the first butting surface 11A of the connector device 1A, a first engaging member such as a raised portion 15A protruding along the depth direction "γ" and extending along the height direction "α" is provided. Moreover, in the second butting surface 12B of the partner connector device 1B, a second engaging member such as a recessed portion 16B recessed along the depth direction "γ" and extending along the height direction "x" is provided corresponding to the first engaging member. Similarly, in the second butting surface 12A of the connector device 1A, a second engaging member such as a recessed portion 16A recessed along the depth direction "γ" and extending along the height direction "α" is provided. Moreover, in the first butting surface 11B of the partner connector device 1B, a first engaging member such as a raised portion 15B protruding along the depth direction "γ" and extending along the height direction "α" is provided corresponding to the second engaging member. As described above, each of the first engaging member and the second engaging member may include the raised portion protruding along the depth direction or the recessed portion recessed along the depth direction. That is, each of the first engaging member and the second engaging member may be formed as the raised portion protruding along the depth direction or the recessed portion recessed along the depth direction.

The first engaging member having the above-described configuration engages with the second engaging member of the second butting surface 12B of the partner connector device 1B when the connector device 1A is connected to the partner connector device 1B, and aligns the connector device 1A and the partner connector device 1B with each other at least in the width direction. Moreover, the second engaging member engages with the first engaging member of the first butting surface 11B of the partner connector device 1B when the connector device 1A is connected to the partner connector device 1B, and aligns the connector device 1A and the partner connector device 1B with each other at least in the width direction. That is, these first and second engaging members have a function of aligning the connector device 1A and the partner connector device 1B with each other particularly in the width direction "β." On this point, for example, at least one depressed portion may be provided at a middle position of the raised portion in the height direction "α," and corresponding to the depressed portion, at least one protruding portion may be provided at a middle position of the recessed portion in the height direction "α." With this configuration, the connector device 1A and the partner connector device 1B can be aligned with each other not only in the width direction "β" but also in the height direction "α." Note that in this case, the connector device 1A and the partner connector device 1B are connectable to each other along the depth direction "γ."

Figure 8:
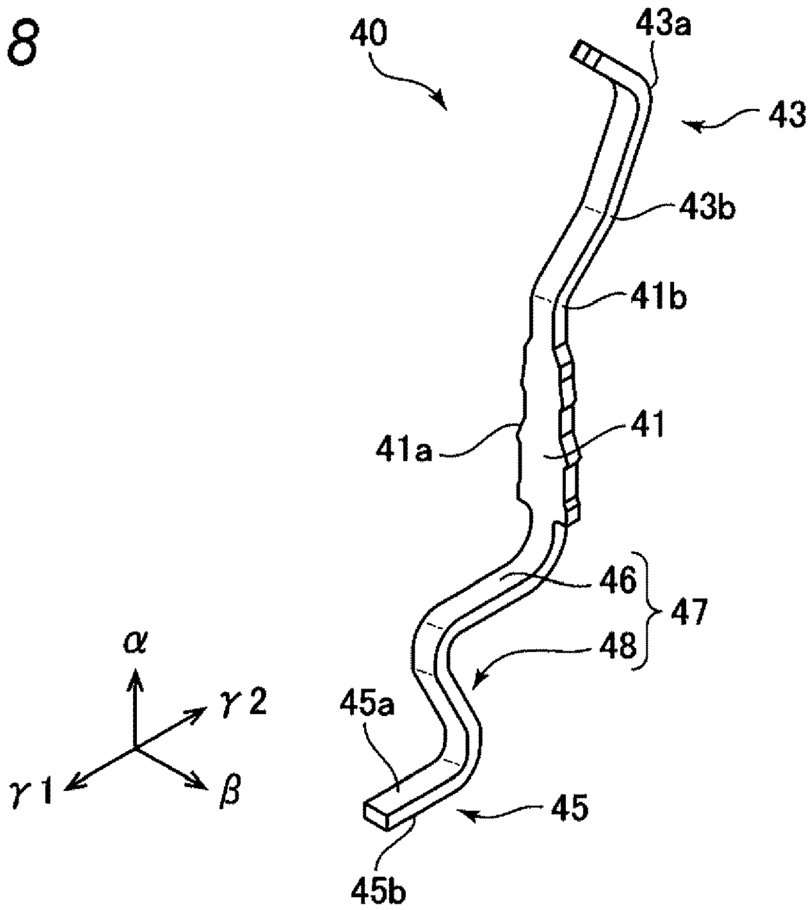
FIG. 8 is a perspective view of a first terminal.
Figure 9:
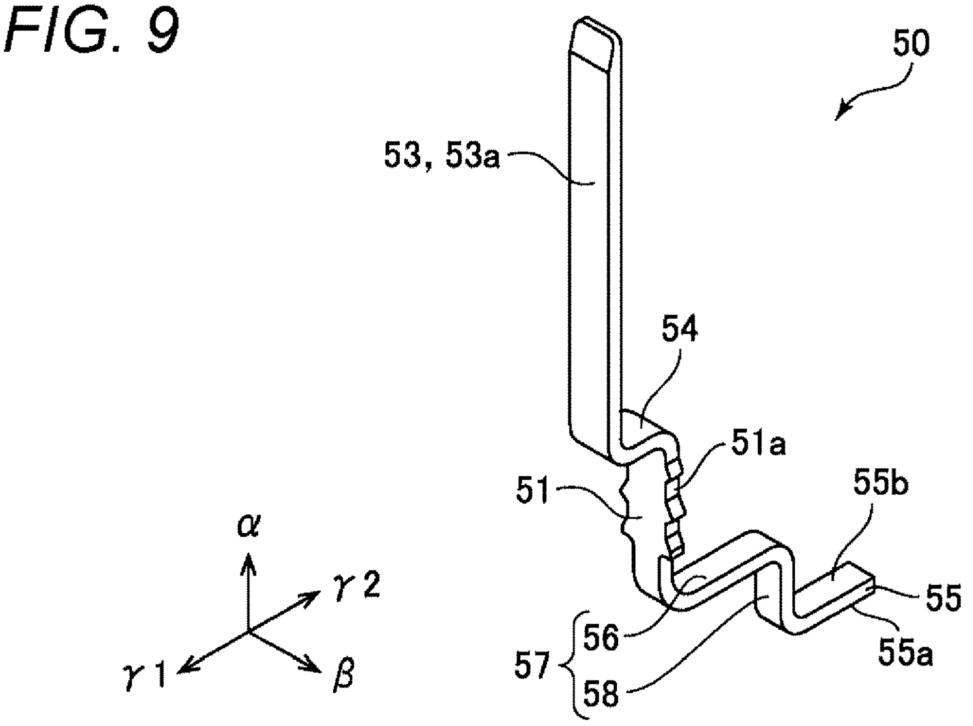
FIG. 9 is a perspective view of a second terminal.
Figure 10:
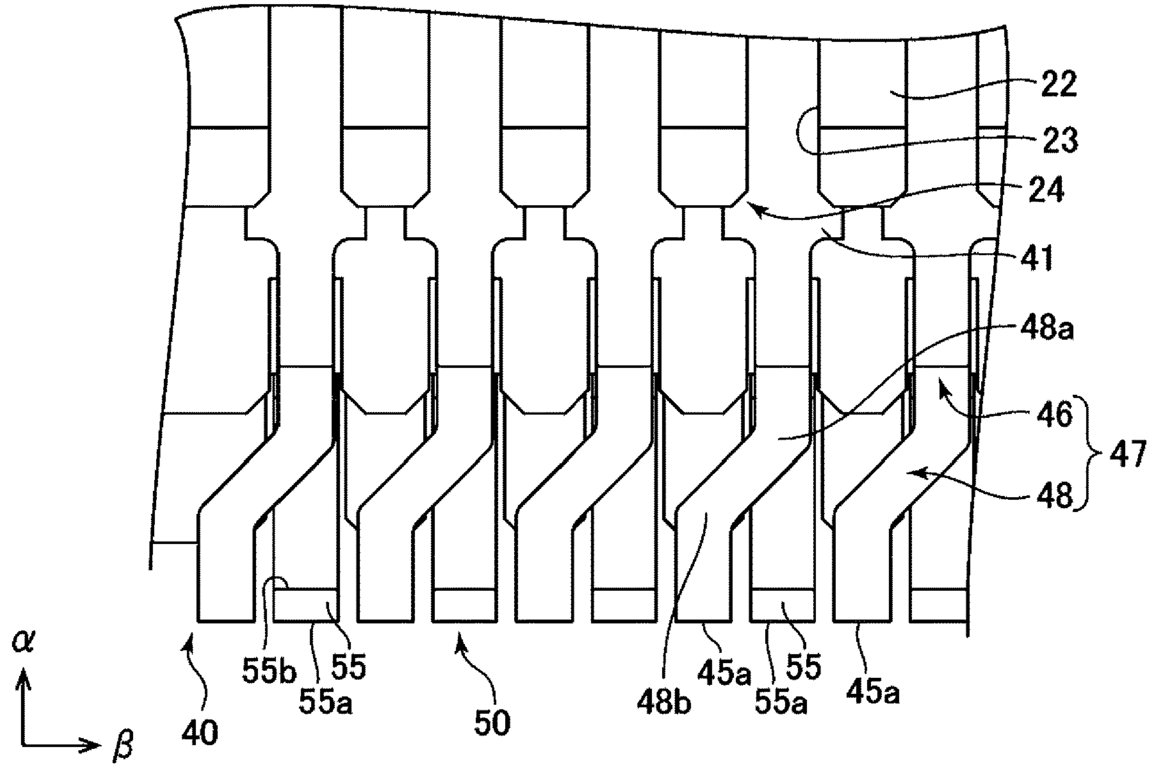
FIG. 10 is a partially-enlarged view of FIG. 5.
Figure 11:
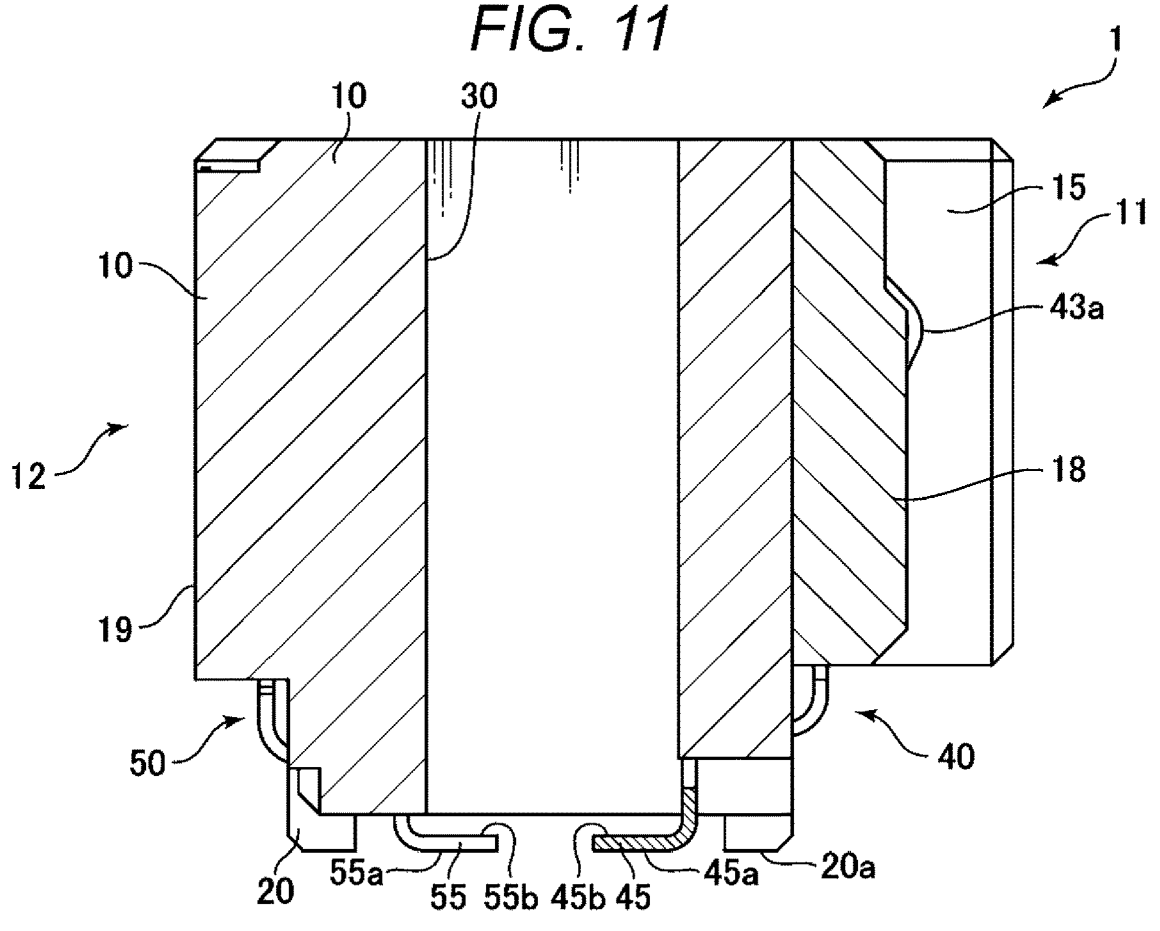
FIG. 11 is a sectional view along an A-A line in FIG. 5.
Figure 12:
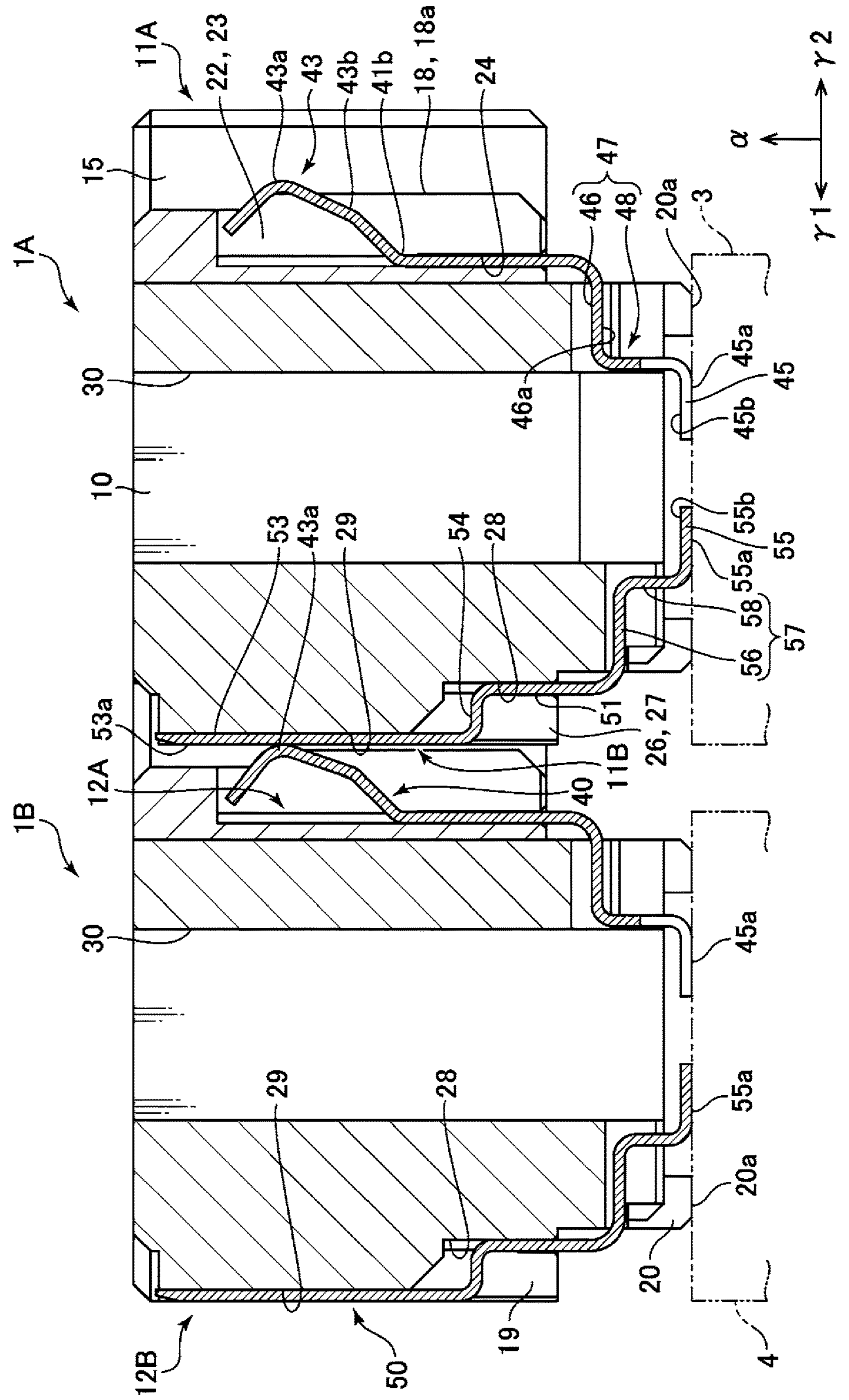
FIG. 12 is a sectional view along a B-B line in FIG. 7.

FIG. 8 is a perspective view of the first terminal 40. FIG. 9 is a perspective view of the second terminal 50. FIG. 10 is a partially-enlarged view of FIG. 5. FIG. 11 is a sectional view along an A-A line in FIG. 5. FIG. 12 is a sectional view along a B-B line in FIG. 7.

The first terminal 40 is formed in such a manner that a single thin metal plate is punched and bent. The first terminal 40 mainly includes a base portion 41, a first contact portion 43 provided on one end side of the base portion 41, a first grounding portion 45 provided on the other end side of the base portion 41, and a leg portion 47 connecting the base portion 41 and the first grounding portion 45 to each other.

The base portion 41 is a portion of the first terminal 40 positioned substantially at the center thereof, and is formed slightly wider than other portions. The width of the base portion 41 on one side on which the first contact portion 43 is provided is set slightly smaller than the width of the base portion 41 on the other side on which the first grounding portion 45 is provided. When the first terminal 40 is held on the housing 10, the base portion 41 is press-fitted and fixed to a housing space 24 of the housing 10 from one side to the other side along the height direction "α." In order to more favorably fix the base portion 41 to the housing 10, a press-fitting protrusion 41*a* protruding outward is provided at the outer edge of the base portion 41 in the width direction. The housing space 24 is arranged inward "γ1" of the housing 10 with respect to the rib 22 in the depth direction "γ." That is, the housing space 24 is arranged on the side closer to the opposing butting surface (second butting surface 12) in a state of the first terminal 40 being held on the housing 10, i.e., the side on which the first grounding portion 45 is provided with respect to the base portion 41 in the depth direction "γ" (see FIG. 12). Further, the housing space 24 is formed wider than the groove 23 in the width direction "β."

The first contact portion 43 is a cantilever beam-shaped elastic displacement portion elastically contactable with the second terminal 50 when the connector device 1A is connected to the partner connector device 1B. The first contact portion 43 is formed in such a manner that the base portion 41 is bent outward "γ2" of a bent portion 41*b*. That is, this direction is the direction apart from the opposing butting surface (second butting surface 12) in the state of the first terminal 40 being held on the housing 10. In other words, this direction is the direction toward the opposite side of the base portion 41 from the side on which the first grounding portion 45 is provided in the depth direction "γ." In the vicinity of the center of the first contact portion 43, a contact 43*a* protruding outward "γ2" to form a raised portion is formed. When the first terminal 40 is held on the housing 10, the first contact portion 43 is housed in the groove 23 of the housing 10, except for the contact 43*a* and the periphery thereof (see FIG. 11). On the other hand, the contact 43*a* and the periphery thereof protrude outward "γ1" to some extent with respect to the rib 22 of the housing 10. When the connector device 1A is connected to the partner connector device 1B, the first contact portion 43 is elastically deformable inward "γ1" by elastically contacting the second terminal 50 at the contact 43*a* and the vicinity thereof. In order to reduce a load upon elastic contact, a small bent portion 43*b* may be additionally provided between the contact 43*a* and the bent portion 41*b*. At least the first contact portions 43 of the first terminals 40 are arrayed at the predetermined intervals along the width direction in the first butting surface 11 of the housing defined by the height direction and the width direction in a state of being contactable with second partner terminals (second terminals 50) of the partner connector device 1B when the connector device 1A is connected to the partner connector device 1B.

The first grounding portion 45 is a portion to be grounded to, e.g., the board and fixed to, e.g., the board by, e.g., soldering when the connector device 1 is installed on, e.g., the board. The first grounding portion 45 is formed in such a manner that one end side of the leg portion 47 (first leg portion) is bent inward "γ1." The first grounding portion 45 extends substantially along the "β-γ" plane defined by the width direction "β" and the depth direction "γ" when the first terminal 40 is held on the housing 10. Here, the term "substantially" means the extent to which fixing of the first grounding portion 45 to the flat board surface is not interfered. One surface of the first grounding portion 45 forms a first grounding surface 45*a* to be grounded to a board 3 or a board 4 (see FIG. 12). A first opposing surface 45*b* opposite to the first grounding surface 45*a* in the height direction "α" is positioned visible through the through-hole 30. As described above, the first grounding surface 45*a* is a surface formed by bending of one end side of the leg portion 47 toward the second butting surface 12.

The leg portion 47 is a portion connecting the base portion 41 and the first grounding portion 45 to each other. The leg portion 47 has a function of arranging the first grounding portion 45 at a position shifted from the first contact portion 43 in the width direction "β." The leg portion 47 has a horizontal portion 46 extending substantially horizontally inward "γ1" and a substantially vertical portion 48. The substantially vertical portion 48 extends in the height direction "α." Further, the substantially vertical portion 48 is formed such that the first grounding portion 45 is shifted in the width direction "β" using bent portions 48*a*, 48*b* provided between the first contact portion 43 and the first grounding portion 45, specifically between the horizontal portion 46 and the first grounding portion 45. That is, the first grounding portion 45 is arranged shifted from the first contact portion 43 in the width direction by the bent portions 48*a*, 48*b* provided between the first grounding portion 45 and the first contact portion 43.

As in the first terminal 40, the second terminal 50 is formed in such a manner that a single thin metal plate is punched and bent. The second terminal 50 mainly includes a base portion 51, a second contact portion 53 provided on one end side of the base portion 51, a second grounding portion 55 provided on the other end side of the base portion 51, and a leg portion 57 connecting the base portion 51 and the second grounding portion 55 to each other.

The base portion 51 is a portion of the second terminal 50 positioned slightly closer to the second grounding portion 55 with respect to the substantially center of the second terminal 50, and is formed slightly wider than other portions. When the second terminal 50 is held on the housing 10, the base portion 51 is press-fitted and fixed to a housing space 28 of the housing 10 along the height direction "α" from one side on which the second contact portion 53 is provided to the other side on which the second grounding portion 55 is provided. In order to more favorably fix the base portion 51 to the housing 10, the outer edge of the base portion 51 in the width direction is provided with an outwardly-protruding press-fitting protrusion 51*a*. The housing space 28 is arranged inward "γ2" of the housing 10 with respect to the rib 26 in the depth direction "γ." That is, the housing space 28 is arranged on the side closer to the opposing butting surface (first butting surface 11) in a state of the second terminal 50 being held on the housing 10, i.e., the side on which the second grounding portion 55 is provided with respect to the base portion 51 in the depth direction "γ" (see FIG. 12). Further, the housing space 28 is formed wider than the groove 27 in the width direction "β."

The second contact portion 53 is a strip-shaped fixing portion contactable with the first terminal 40 when the connector device 1A is connected to the partner connector device 1B. The second contact portion 53 is coupled to the base portion 51 through a first horizontal portion 54 extending outward "γ1" opposite to inward "γ2." When held on the housing 10, the second terminal 50 is mounted on a mount surface 29 of the housing 10, and fully or substantially fully housed in the groove 27 of the housing 10. When the connector device 1A is connected to the partner connector device 1B, the second contact portion 53 is contactable with the first terminal 40 at a contact surface 53*a*. When the connector device 1A is connected to the partner connector device 1B, at least the second contact portions 53 of the second terminals 50 are arrayed at the predetermined intervals along the width direction at positions corresponding to the first terminals 40 in the second butting surface 12 of the housing 10 defined by the height direction and the width direction and positioned facing the first butting surface 11 in the depth direction in a state of being contactable with first partner terminals (second terminals 50) of the partner connector device 1B.

The second grounding portion 55 is a portion to be grounded to, e.g., the board and fixed to, e.g., the board by, e.g., soldering when the connector device 1 is installed on, e.g., the board. The second grounding portion 55 is formed in such a manner that one end side of the leg portion 57 (second leg portion) is bent inward "γ2." The second grounding portion 55 extends substantially along the "β-γ" plane defined by the width direction "β" and the depth direction "γ" when the second terminal 50 is held on the housing 10. Here, the term "substantially" means the extent to which fixing of the second grounding portion 55 to the flat board surface is not interfered. One surface of the second grounding portion 55 forms a second grounding surface 55*a* to be grounded to the board 3 or the board 4 (see FIG. 12). A second opposing surface 55*b* opposite to the second grounding surface 55*a* in the height direction "α" is positioned in a state of being visible through the through-hole 30. As described above, the first grounding surface 45*a* and the second grounding surface 55*a* extend substantially along the plane defined by the width direction and the depth direction. The second grounding surface 55*a* is a surface formed by bending of one end side of the leg portion 57 toward the first butting surface 11.

The leg portion 57 is a portion connecting the base portion 51 and the second grounding portion 55 to each other. The leg portion 57 has a second horizontal portion 56 extending substantially horizontally inward "γ2" and a vertical portion 58. The vertical portion 58 extends only in the height direction "α." Note that the second grounding portion 55 may be arranged shifted from the second contact portion 53 in the width direction by a bent portion provided between the second grounding portion 55 and the second contact portion 53.

As clearly seen from FIGS. 10 to 12, according to the connector device 1 having the above-described configuration, when the first butting surface 11 or the second butting surface 12 of the connector device 1 is viewed along the depth direction "γ," at least part of the first grounding surface 45*a* of the first grounding portion 45, at least part of the second grounding surface 55*a* of the second grounding portion 55, and a grounding surface 20*a* of the leg portion 20 can be simultaneously visually recognized. As a result, for example, a positional relationship in the height direction "α" between the first grounding surface 45*a* and the second grounding surface 55*a* can be compared (grasped), and the flatness of these surfaces can be easily and favorably measured.

As clearly seen from FIGS. 10 and 11, according to the connector device 1 having the above-described configuration, when the first terminal 40 and the second terminal 50 are viewed along the height direction "x" through the through-hole 30, at least part of the first opposing surface 45*b* of the first grounding portion 45 opposite to the first grounding surface 45*a* in the height direction "α" and at least part of the second opposing surface 55*b* of the second grounding portion 55 opposite to the second grounding surface 55*a* in the height direction "α" can be simultaneously visually recognized. As a result, for example, the states of the first opposing surface 45*b* and the second opposing surface 55*b* in the connector device 1 can be easily measured and checked using, e.g., an optical tool.

In order to easily and favorably perform such measurement etc., for example, when the first butting surface 11 or the second butting surface 12 is viewed along the depth direction, the first grounding surfaces 45*a* and the second grounding portions 55 are preferably alternately arranged in the width direction "β." For example, when the first butting surface 11 or the second butting surface 12 is viewed along the depth direction, the first grounding surfaces 45*a* and the second grounding surfaces 55*a* are preferably arranged apart from each other in the width direction "β."

Other aspects, features, and effects of the technique of the present disclosure are apparent from many specific embodiments and examples, which include best modes, for implementing the technique of the present disclosure. For example, instead of or in addition to the bent portion, the width of the first grounding portion 45, which is provided on the other end side of the first terminal 40, in the width direction "β" and the width of the second grounding portion 55, which is provided on the other end side of the second terminal 50, in the width direction "β" may be different from each other. Further, for example, the grounding portion positioned on the side near a viewer (viewing device) may be formed smaller, and on the other hand, the grounding portion positioned on the far side may be formed larger. With this configuration, at least part of the first grounding surface 45*a* of the first grounding portion 45 and at least part of the second grounding surface 55*a* of the second grounding portion 55 can be easily simultaneously visually recognized. The width of the first grounding portion 45, which is provided on the other end side of the first terminal 40, in the width direction "β" and the width of the second grounding portion 55, which is provided on the other end side of the second terminal 50, in the width direction "β" may be the same as each other. In this case, for example, the grounding portion positioned on the near side may have a width of less than the half of the leg portion (47), and may be formed on either one of the right or left side in the width direction "β." Corresponding to such a grounding portion, the grounding portion positioned on the far side may have a width of less than the half of the leg portion (57), and may be formed on the other one of the right or left side in the width direction "β." With this configuration, the entirety or substantially entirety of the first grounding surface 45*a* of the first grounding portion 45 and the entirety or substantially entirety of the second grounding surface 55*a* of the second grounding portion 55 can be simultaneously visually recognized. Further, the technique of the present disclosure may be implemented as different other embodiments. Changes can be made to many details of these embodiments on various clear points without departing from the spirit and scope of the technique of the present disclosure. Thus, the drawings and the description are merely examples of the technique of the present disclosure, and the technique of the present disclosure is not limited thereto.

For example, as long as it is possible to perform measurement etc., a plurality of grounding surfaces of the same terminal may be arranged in the width direction "β." The first grounding surface 45*a* and the second grounding surface 55*a* may have an overlap in the width direction "β." Instead of the first terminal, the second terminal may be provided with a bent portion. Alternatively, both these terminals may be provided with bent portions.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A connector device comprising:

a housing having a height direction, a width direction, and a depth direction perpendicular to each other; and a plurality of first terminals and a plurality of second terminals held on the housing, wherein each of the first terminals has a first contact portion provided on one end side, and at least the first contact portions of the first terminals are arrayed at a predetermined interval along the width direction in a first butting surface of the housing defined by the height direction and the width direction in a state of being contactable with second partner terminals of a partner connector device when the connector device is connected to the partner connector device, each of the second terminals has a second contact portion provided on one end side, and at least the second contact portions of the second terminals are arrayed at the predetermined interval along the width direction at positions corresponding to the first terminals in a second butting surface of the housing defined by the height direction and the width direction and positioned facing a first butting surface of the partner connector device in the depth direction in a state of being contactable with first partner terminals of the partner connector device when the connector device is connected to the partner connector device, and when the first butting surface or the second butting surface is viewed along the depth direction, at least part of first grounding surfaces of first grounding portions provided on another end side of the first terminals and at least part of second grounding surfaces of second grounding portions provided on another end side of the second terminals are simultaneously visually recognizable, and each of the first grounding portions is arranged shifted from each of the first contact portions in the width direction by a bent portion provided between each of the first grounding portions and each of the first contact portions.

2. The connector device according to claim 1, wherein
a width of the first grounding portion, which is provided on the other end side of each of the first terminals, in the width direction is different from a width of the second grounding portion, which is provided on the other end side of each of the second terminals, in the width direction.

3. The connector device according to claim 1, wherein
when the first butting surface or the second butting surface is viewed along the depth direction, the first grounding surfaces and the second grounding surfaces are alternately arranged in the width direction.

4. The connector device according to claim 1, wherein
when the first butting surface or the second butting surface is viewed along the depth direction, the first grounding surfaces and the second grounding surfaces are arranged apart from each other in the width direction.

5. The connector device according to claim 1, wherein
the first grounding surfaces and the second grounding surfaces extend substantially along a plane defined by the width direction and the depth direction.

6. The connector device according to claim 5, wherein
each of the first grounding surfaces is a surface formed in such a manner that one end side of a first leg portion of each of the first terminals is bent toward the second butting surface, and/or
each of the second grounding surfaces is a surface formed in such a manner that one end side of a second leg portion of each of the second terminals is bent toward the first butting surface.

7. The connector device according to claim 1, wherein
the housing is provided with a through-hole penetrating the housing in the height direction, and
when the first terminals and the second terminals are viewed along the height direction through the through-hole, at least part of first opposing surfaces of the first grounding portions opposite to the first grounding surfaces in the height direction and at least part of second opposing surfaces of the second grounding portions opposite to the second grounding surfaces in the height direction are simultaneously visually recognizable.

8. The connector device according to claim 1, further comprising:
a first engaging member that is provided in the first butting surface of the connector device and engages with a second engaging member of a second butting surface of the partner connector device to align the connector device and the partner connector device with each other at least in the width direction when the connector device is connected to the partner connector device; and/or
a second engaging member that is provided in the second butting surface of the connector device and engages with a first engaging member of a first butting surface of the partner connector device to align the connector device and the partner connector device with each other at least in the width direction when the connector device is connected to the partner connector device.

9. The connector device according to claim 8, wherein
each of the first engaging member and the second engaging member includes a raised portion protruding along the depth direction or a recessed portion recessed along the depth direction.

10. The connector device according to claim 1, wherein
the connector device and the partner connector device have an identical structure.

11. A connector device comprising:
a housing having a height direction, a width direction, and a depth direction perpendicular to each other; and
a plurality of first terminals and a plurality of second terminals held on the housing,
wherein each of the first terminals has a first contact portion provided on one end side, and at least the first contact portions of the first terminals are arrayed at a predetermined interval along the width direction in a first butting surface of the housing defined by the height direction and the width direction in a state of being contactable with second partner terminals of a partner connector device when the connector device is connected to the partner connector device,
each of the second terminals has a second contact portion provided on one end side, and at least the second contact portions of the second terminals are arrayed at the predetermined interval along the width direction at positions corresponding to the first terminals in a second butting surface of the housing defined by the height direction and the width direction and positioned facing a first butting surface of the partner connector device in the depth direction in a state of being contactable with first partner terminals of the partner connector device when the connector device is connected to the partner connector device,
when the first butting surface or the second butting surface is viewed along the depth direction, at least part of first grounding surfaces of first grounding portions provided on another end side of the first terminals and at least part of second grounding surfaces of second grounding portions provided on another end side of the second terminals are simultaneously visually recognizable,
the housing is provided with a through-hole penetrating the housing in the height direction, and
when the first terminals and the second terminals are viewed along the height direction through the through-hole, at least part of first opposing surfaces of the first grounding portions opposite to the first grounding surfaces in the height direction and at least part of second opposing surfaces of the second grounding portions opposite to the second grounding surfaces in the height direction are simultaneously visually recognizable.

12. The connector device according to claim 11, wherein
a width of the first grounding portion, which is provided on the other end side of each of the first terminals, in the width direction is different from a width of the second grounding portion, which is provided on the other end side of each of the second terminals, in the width direction.

13. The connector device according to claim 11, wherein
when the first butting surface or the second butting surface is viewed along the depth direction, the first grounding surfaces and the second grounding surfaces are alternately arranged in the width direction.

14. The connector device according to claim 11, wherein
when the first butting surface or the second butting surface is viewed along the depth direction, the first grounding surfaces and the second grounding surfaces are arranged apart from each other in the width direction.

15. The connector device according to claim 11, wherein the first grounding surfaces and the second grounding surfaces extend substantially along a plane defined by the width direction and the depth direction.

16. The connector device according to claim 15, wherein each of the first grounding surfaces is a surface formed in such a manner that one end side of a first leg portion of each of the first terminals is bent toward the second butting surface, and/or each of the second grounding surfaces is a surface formed in such a manner that one end side of a second leg portion of each of the second terminals is bent toward the first butting surface.

17. The connector device according to claim 11, further comprising:

a first engaging member that is provided in the first butting surface of the connector device and engages with a second engaging member of a second butting surface of the partner connector device to align the connector device and the partner connector device with each other at least in the width direction when the connector device is connected to the partner connector device; and/or a second engaging member that is provided in the second butting surface of the connector device and engages with a first engaging member of a first butting surface of the partner connector device to align the connector device and the partner connector device with each other at least in the width direction when the connector device is connected to the partner connector device.

18. The connector device according to claim 17, wherein each of the first engaging member and the second engaging member includes a raised portion protruding along the depth direction or a recessed portion recessed along the depth direction.

19. The connector device according to claim 11, wherein the connector device and the partner connector device have an identical structure.

* * * * *